Figure 1:
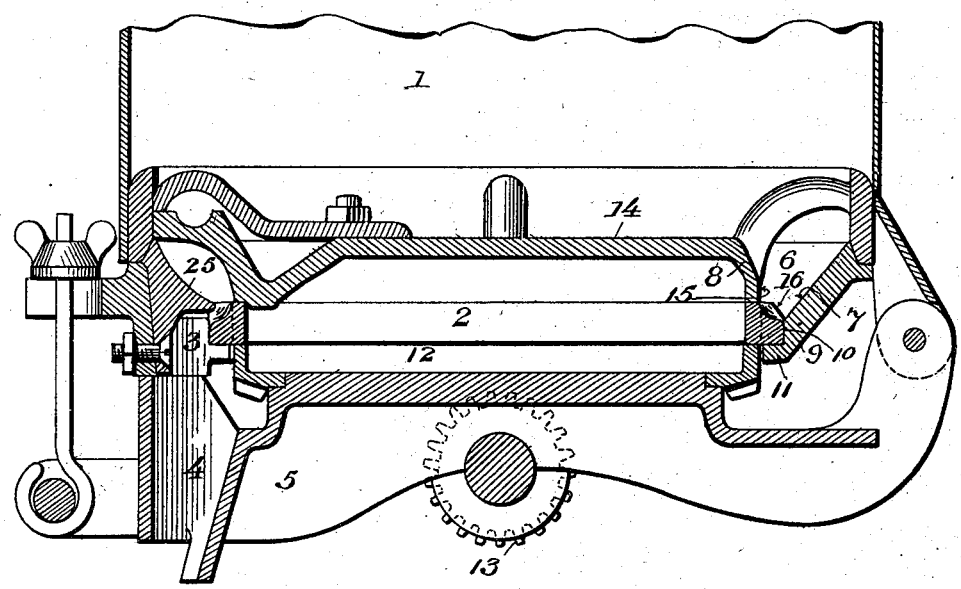

No. 725,460. PATENTED APR. 14, 1903.
A. C. LINDGREN.
SEED DROPPING MECHANISM.
APPLICATION FILED JAN. 15, 1903.
NO MODEL. 2 SHEETS—SHEET 1.

Witnesses
F. S. Elmore
W. R. Kennedy

Inventor
A. C. Lindgren
by Phil. T. Dodge
Attorney

THE NORRIS PETERS CO., PHOTO-LITHO., WASHINGTON, D. C.

No. 725,460. PATENTED APR. 14, 1903.
A. C. LINDGREN.
SEED DROPPING MECHANISM.
APPLICATION FILED JAN. 15, 1903.
NO MODEL. 2 SHEETS—SHEET 2.
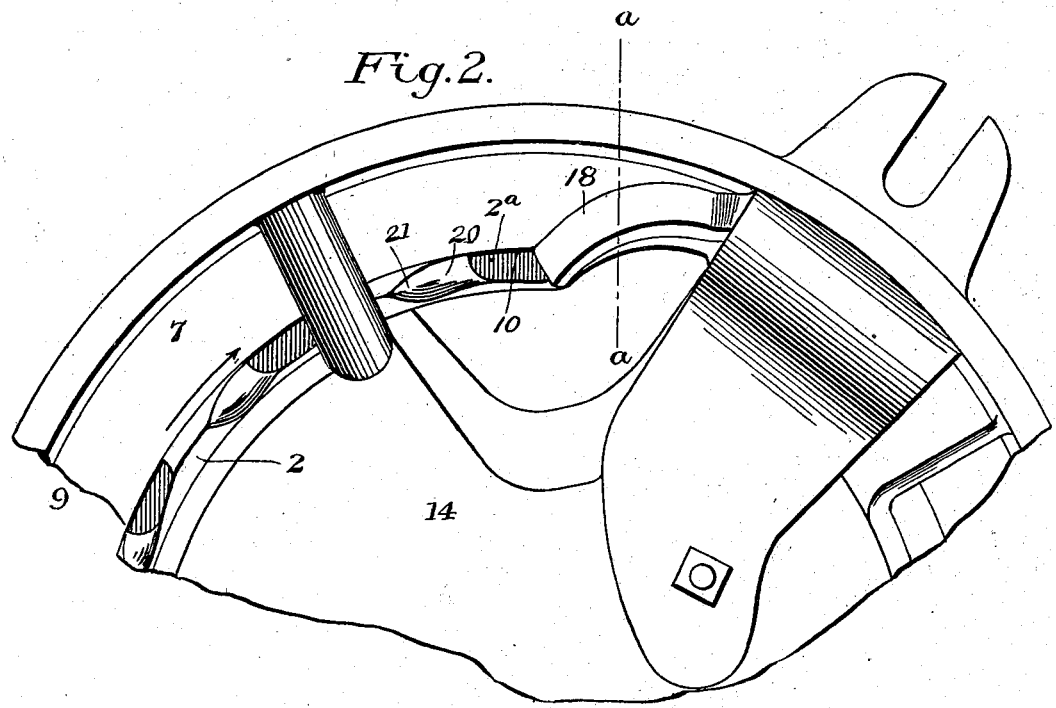
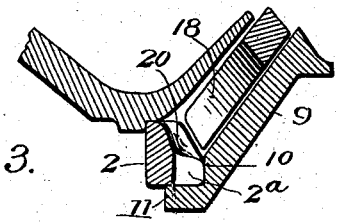
  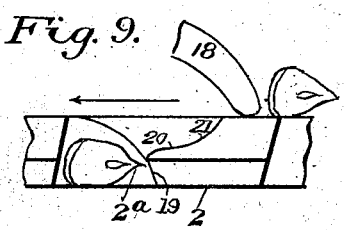

UNITED STATES PATENT OFFICE.

ALEXUS C. LINDGREN, OF MOLINE, ILLINOIS, ASSIGNOR TO THE MOLINE PLOW COMPANY, A CORPORATION OF ILLINOIS.

SEED-DROPPING MECHANISM.

SPECIFICATION forming part of Letters Patent No. 725,460, dated April 14, 1903.

Application filed January 15, 1903. Serial No. 139,137. (No model.)

*To all whom it may concern:*

Be it known that I, ALEXUS C. LINDGREN, of Moline, county of Rock Island, and State of Illinois, have invented a new and useful Improvement in Seed-Dropping Mechanisms, of which the following is a specification.

This invention relates to seed-dropping mechanisms of the type employed in planting corn, in which the kernels from an overlying mass of seed in the hopper enter cells in a rotary seed-plate in the bottom of the hopper and standing on edge in the cells are carried around to the point of delivery, where they are discharged, one from each cell. The kernels thus individually discharged are by suitable mechanism accumulated in quantities sufficient to plant a hill, (usually three kernels to each hill,) and the accumulated grains are dropped together at predetermined points in the ground. In mechanisms operating in this manner it is of the utmost importance that the seed-plate deliver but a single kernel at a time into the discharge-opening as the cells pass by the same in succession and also that there be no interruption in this action; otherwise the accumulation of grains will comprise too many or too few kernels.

In practice it has been found that the best results are accomplished if the seed-plate is arranged at the bottom of a channel of such size and shape as to allow the grains to arrange themselves in promiscuous and indiscriminate positions, and to insure the entrance of the kernels from this channel into the cells in an edgewise position and with unfailing certainty demands a seed-plate of peculiar form and construction and bearing a peculiar relation to the overlying channel.

The overlying channel is of general flaring form in cross-section—that is to say, it is composed of outer and inner walls, which slope downward toward each other—and the seed-plate is arranged at their nearest point of approach, which seed-plate is, in accordance with my invention, formed with a downwardly and outwardly sloping surface forming a continuation of the sloping inner wall of the channel and constituting, in effect, a movable bottom section of said inner wall, the action of which is to greatly facilitate the entrance of the kernels on edge into the cells. The seed-cells are formed at intervals in this plate and are of such shape and size that the kernels can enter on edge only, and by reason of the sloping surface on the plate it is necessary that the cells be of unusual and considerable depth, and by reason of this fact it is usual for two grains to enter the cells on edge, one on top of the other. This action of the grains demands an effective means for removing the upper one and preventing it from being discharged with the other, and this is accomplished by a cut-off coöperating with a peculiar formation of the cell, as will be more fully described hereinafter and constituting the main feature of my invention.

My invention therefore consists, first, of a seed-plate provided with a sloping surface constituting a movable inner wall of a channel in which the grains may arrange themselves promiscuously before entering the cells in the plate; secondly, of a seed-plate having cells of a form which will receive the kernels on edge and peculiarly constructed to facilitate the action of the cut-off in removing from the cell any other than a single kernel occupying its proper position therein; thirdly, in combination with a plate formed with cells of this peculiar construction, a surface extending over the discharge-opening and arranged with relation to the path of the cells, that in the event of the cut-off failing to remove the extra kernel the latter will be pushed onto this surface and advanced over and beyond the discharge-opening.

The invention consists also in the details of construction and combination of parts hereinafter described and claimed.

Figures 4, 5:
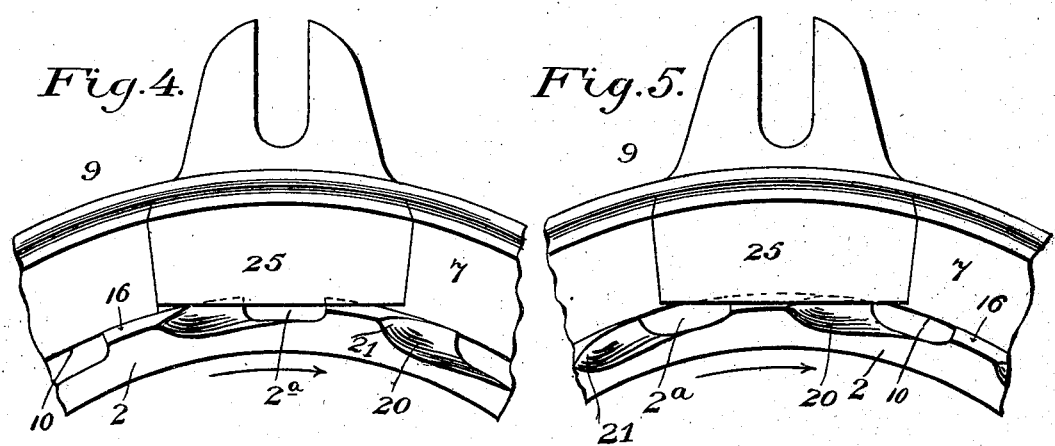
Figure 6:
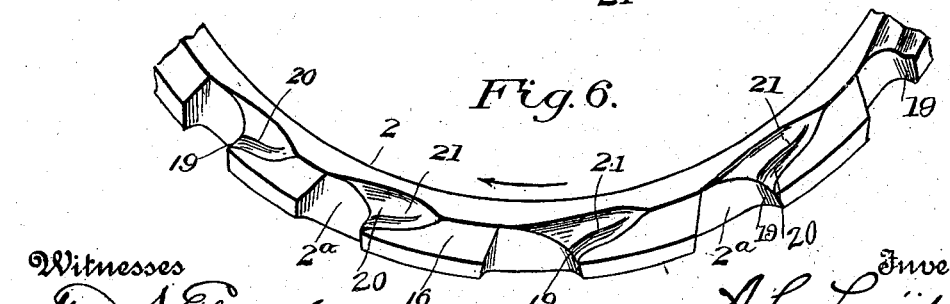

In the accompanying drawings, Figure 1 is a vertical central section through a hopper-bottom having my invention embodied therein. Fig. 2 is a top plan view looking down into the hopper adjacent to the cut-off. Fig. 3 is a sectional elevation, on an enlarged scale, on the line $a\ a$ of Fig. 2. Fig. 4 is a plan view looking into the hopper at the point where the grains are discharged from the cells. Fig. 5 is a similar view showing the seed-plate occupying an advanced position. Fig. 6 is a perspective view of the seed-plate removed.

Figs. 7, 8, and 9 are elevations of a portion of the seed-plate and the cut-off, showing the progressive action of the cut-off in removing the extra kernel.

Referring to the drawings, 1 represents a hopper, which is adapted to receive a supply of seed to be planted, and 2 represents a seed-discharge mechanism in the form of a rotary ring, which for the purpose of uniformity of description I will term the "seed-plate." This plate is situated in the hopper-bottom and is provided with seed-cells $2^a$, adapted to receive from the mass of overlying seed the kernels on edge and deliver the same one at a time through a discharge-opening 3 in the bottom of the hopper, which opening communicates with a delivery-throat 4 in a casting or frame 5, and this throat in turn directs the seed into the conduit in the runner, (not shown,) whence they pass into the ground.

The hopper-bottom immediately over the seed-ring is formed with an annular channel 6, which channel comprises an outer fixed inwardly and downwardly sloping wall 7 and an inner downwardly and outwardly sloping wall 8, these two walls constituting a channel of flaring form of cross-section in which the seed arrange themselves and settle in indiscriminate positions and from which they enter the cells in edgewise positions, as will be more fully described hereinafter. The outer wall of this channel is formed by a bottom ring 9, which gives support to the hopper and rests on the frame 5, being provided at one side with the discharge-opening 3, before alluded to. Below this sloping surface 7 the inner surface of this ring extends vertically downward, as at 10, which vertical surface constitutes the outer walls of the seed-cells, and from the bottom of this surface the ring extends inward horizontally, as at 11, which horizontal surface constitutes the bottoms of the seed-cells and affords a ledge on which the seed-plate rotates, which latter is driven by a gear-ring 12, interlocked therewith and supported by the frame 5 and receiving motion from a pinion 13 in the usual manner.

The inner wall of the channel 6 is formed partly by a fixed cap-plate 14, sustained by the hopper and covering the interior of the seed-plate and serving to support the body of the overlying seed in the hopper. The outer edge of this cap-plate extends outwardly and downwardly for the main portion of its height and then a short distance vertically, as at 15, to the upper edge of the seed-plate, where it terminates and exposes the outer edge of this plate, which outer edge is sloped outward and downward, as at 16, and forms a continuation of the sloping surface of the cap-plate and meets the lower edge of the outer surface 7 of the channel 6. It is seen, therefore, that the sloping surface on the seed-plate constitutes, in effect, a movable bottom section of the inner wall of the channel 6, and in practice it has been found that this moving surface inclining outward and downward aids in connection with the sloping outer wall to the greatest extent in effecting the entrance of the kernels on edge into the cells from the mass of overlying indiscriminately-arranged seed in the channel 6.

The seed-cells $2^a$, before alluded to, are formed at intervals in the sloping surface of the seed-plate by cutting or recessing the same vertically, which recesses extend the entire height of the plate, leaving between them solid sections of the sloping surface, the ends of which sections constitute the end walls of the cells, while the outer walls and bottoms of the cells are formed by the bottom ring 9 and the inner walls by the seed-plate itself.

By reason of the provision of the sloping surface on the seed-plate it is necessary to make the cells of considerable depth and of course much deeper than if this sloping surface were omitted, and when of such depth it has been found that two grains usually occupy a cell, both on edge and one on top of the other, as shown in Fig. 7. This condition and action of the kernels demands that the upper one, which for convenience of description I will term "extra kernel," be removed before the discharge is reached by the cell in order that but one kernel will be delivered by each cell. The removal of this extra kernel is effected by a cut-off 18, Figs. 2, 6, 7, 8, and 9, consisting of a yielding finger mounted in the cap-plate and extending downward into the channel 6, with its end shaped to bear against the sloping surface of the seed-plate, as shown particularly in Fig. 3. In order, however, that this finger may act with unfailing certainty in removing the extra kernel notwithstanding the unusual depth of the cells, I propose to reduce the height of the rear wall of the cells, as at 19, and to form as a rearward continuation of said reduced wall a horizontal surface or shelf 20, formed by cutting out or recessing the forward ends or portions of the solid sections of the sloping surface of the plate. These shelves being about the height of the properly-seated kernel readily receive the extra kernal, as the plate in its rotation carries the extra kernel against the cut-off finger (see Figs. 7 and 8) and the latter maintaining engagement with the kernel pushes it along the shelf, up the rear end of the same, which gradually inclines upward, as at 21, and finally joins the upper surface of the plate. It is seen, therefore, that while securing the advantages of the sloping surface of the plate in facilitating the entrance of the kernels into the cells on edge I by means of the peculiar form of the plate at the rear ends of the cells, as described, prevent the unusual depth of the cells incident to the sloping surface from interfering with the action of the cells in delivering each a single kernel into the discharge-opening, and this is the main feature of my invention.

The reduced rear end wall of the cells is inclined rearward slightly, so that its tendency will be to hold the grain down as the latter is carried around to the point of discharge.

It may sometimes happen that the kernel standing on end will raise the cut-off finger high enough to allow the extra kernel to pass under it, and in order that in this event this extra kernel may be prevented from entering the discharge-opening with the properly-seated kernel the discharge-opening has projecting over it and formed as a continuation of the outer wall 7 of the channel a surface 25, Figs. 1, 4, and 5, which surface extends adjacent to the path of the seed-cells and in such position that the extra kernel will pass onto it and be carried over and beyond the discharge-opening and into the mass of seed in the channel beyond, the properly-seated kernel at the same time passing beneath the surface 25 and finding its proper exit through the discharge-opening. As the extra kernel, which has passed beneath the cut-off, approaches this surface 25 it, encountering its edge, is worked back up the incline of the supporting-shelf and in this manner is permitted to readily leave the seed-plate and pass onto the surface. It is seen, therefore, that there is a coöperation between this surface 25 and the peculiar form of the seed-plate with the shelves.

Having thus described my invention, what I claim is—

1. In a seed-dropping mechanism a seed-plate having therein cells with one end wall less in height than the other end wall, and means for rotating said plate so that the higher wall will travel in advance of the other.

2. In a seed-dropping mechanism, the combination with a cut-off, of a rotary seed-plate provided with seed-cells each of which is formed at one end with a shelf on a plane below the upper edge of the cell, and means for rotating the plate in relation to the cut-off that each cell will pass the cut-off in advance of its shelf; whereby the extra kernel in the cell will be forced onto the shelf.

3. In a seed-dropping mechanism a rotary seed-plate having therein seed-cells with their rear end walls less in height than the front end walls, and provided with a horizontal shelf extending rearward from the upper end of the rear wall.

4. In a seed-dropping mechanism a rotary seed-plate having therein cells with their rear walls inclined rearward and downward.

5. In a seed-dropping mechanism a rotary seed-plate having therein cells with their front end walls of greater height than the rear end walls, and the latter inclining rearward and downward.

6. In a seed-dropping mechanism a rotary seed-plate having therein seed-cells formed at the rear ends with a shelf on a plane below the upper edge of the cell, said shelf sloping upward at its rear end.

7. In a seed-dropping mechanism the combination with a hopper-bottom formed with an outer downwardly and inwardly sloping wall, 7, of a rotary seed-plate, mounted in said hopper, and having its outer edge sloping downwardly and outwardly and meeting the lower edge of wall 7, seed-cells formed at intervals in the sloping edge of the seed-plate, and a cap-plate overlying the seed-plate and provided with a circular edge sloping upwardly and inwardly from the upper edge of the seed-plate and forming a continuation of the exposed edge of the seed-plate; whereby there is presented immediately over the cells a flaring channel, the outer wall being formed by the hopper-bottom, while the inner wall is formed jointly by the seed-plate and the cap-plate.

8. In a seed-dropping mechanism the combination with a hopper-bottom formed with a channel having its outer wall sloping downward and inward, of a seed-plate at the bottom of said channel provided with a downwardly and outwardly sloping surface and with seed-cells having their rear end wall less in height than the front wall, and formed at their rear ends with a shelf extending rearward, a cut-off extending into the channel, and means for rotating the seed-plate so that the front high wall of each cell will pass by the cut-off in advance of its lower rear wall.

9. In combination with a hopper-bottom provided with a discharge-opening and formed with a channel for the indiscriminate collection of seed, said bottom having a surface projecting outward beyond the general surface and over the discharge-opening, a seed-plate in the bottom of the hopper having cells formed with rear walls less in height than the front walls, and provided at their rear ends with shelves arranged below the upper edge of the cells, and means for rotating the seed-plate so that the high wall will pass the discharge-opening in advance of the lower wall.

10. In a seed-dropping mechanism the combination of a seed-plate formed with seed-cells of a size adapted to hold two grains on edge one on top of the other, said cells having at their rear ends a supporting-surface in position to receive the upper kernel, a cut-off and means for rotating the plate in relation to the cut-off to advance the upper kernel against the cut-off whereby it will be pushed onto the supporting-surface.

In testimony whereof I hereunto set my hand, this 12th day of January, 1903, in the presence of two attesting witnesses.

ALEXUS C. LINDGREN.

Witnesses:
L. C. BLANDING,
P. M. PRICE.